(12) United States Patent
Yin et al.

(10) Patent No.: US 11,662,273 B2
(45) Date of Patent: May 30, 2023

(54) UNIVERSAL SUSPENSION AND TEST EQUIPMENT FOR AUTOMOBILE CHASSIS SIMULATION ROAD TEST

(71) Applicant: CITIC Dicastal Co., Ltd., Qinhuangdao (CN)

(72) Inventors: Zhigao Yin, Qinhuangdao (CN); Desheng Chen, Qinhuangdao (CN); Hanqi Wu, Qinhuangdao (CN); Zuo Xu, Qinhuangdao (CN); Guoyuan Xiong, Qinhuangdao (CN)

(73) Assignee: CITIC Dicastal Co., Ltd., Qinhuangdao (CN)

(*) Notice: Subject to any disclaimer, the term of this patent is extended or adjusted under 35 U.S.C. 154(b) by 29 days.

(21) Appl. No.: 17/368,289

(22) Filed: Jul. 6, 2021

(65) Prior Publication Data
US 2022/0316990 A1    Oct. 6, 2022

(30) Foreign Application Priority Data
Apr. 1, 2021   (CN) .......................... 202110353819.6

(51) Int. Cl.
*G01M 17/04*    (2006.01)
*G01M 17/007*   (2006.01)

(52) U.S. Cl.
CPC ........ *G01M 17/04* (2013.01); *G01M 17/0078* (2013.01)

(58) Field of Classification Search
CPC ...... G01M 17/04; G01M 17/013; G01M 7/08; G01B 5/255
See application file for complete search history.

(56) References Cited

U.S. PATENT DOCUMENTS

2017/0219459 A1* 8/2017 Liu .................. G01M 17/0078

FOREIGN PATENT DOCUMENTS

CN        208000201 U  * 10/2018  ............ G01M 17/04

OTHER PUBLICATIONS

Sivananth, V. & Vijayarangan, S . . . (2015). Fatigue life analysis and optimization of a passenger car steering knuckle under operating conditions. International Journal of Automotive and Mechanical Engineering. 11. 2417-2429. 10.15282/ijame.11.2015.22.0203. (Year: 2015).*

* cited by examiner

*Primary Examiner* — Eric S. McCall
*Assistant Examiner* — Timothy P Graves
(74) *Attorney, Agent, or Firm* — IPro, PLLC

(57) ABSTRACT

The present disclosure belongs to the technical field of tests of wheels and automobile chassis suspension systems, and provides a universal suspension and test equipment for an automobile chassis simulation road test. A simulated dashpot is movably connected to a simulated shock absorption tower; a simulated steering link and a simulated lower control arm are both movably connected to a backboard; and the simulated dashpot, the simulated steering link, and the simulated lower control arm are all assembled with corresponding mounting holes in a steering knuckle. Simulated parts with adjustable lengths and positions are used to replace an original vehicle's dashpot, steering link and lower control arm of a suspension, so that by means of adjusting lengths and angles of all the parts of the test suspension, the universal suspension can be applicable to the spatial hard point requirements of most current Macpherson suspensions.

9 Claims, 3 Drawing Sheets

UNIVERSAL SUSPENSION AND TEST EQUIPMENT FOR AUTOMOBILE CHASSIS SIMULATION ROAD TEST

TECHNICAL FIELD

The present application relates to the technical field of tests for wheels and automobile chassis suspension systems, in particular to a universal suspension and test equipment for an automobile chassis simulation road test.

BACKGROUND

In a vehicle test process, in order to ensure the reliability of an automobile chassis system and save the development cost of a full vehicle, chassis system manufacturers generally use a simulation road test to verify the durability of the chassis system and chassis system's parts.

Manufacturers of chassis parts such as wheels and steering knuckles often supply products to multiple mainframe factories at the same time. In order to test the durability of the parts, different products need to be used to make different test fixtures and suspension systems, so that frequent manufacturing and replacement of suspension systems not only increase the product development cost, but also consume lots of human and material resources.

SUMMARY

The embodiments of the present disclosure provide a universal suspension and test equipment for an automobile chassis simulation road test. The universal suspension design can cooperate with a road test machine to verify the performance of chassis parts such as wheels and steering knuckles and solve the problems of frequent manufacturing of a suspension system and replacement of test fixtures in the existing automobile part test; and moreover, the universal suspension can replace the original vehicle's suspension system, thereby shortening the full-vehicle development period and reducing the development cost.

In order to achieve the above purposes, the present disclosure provides the following technical solution.

In a first aspect, provided is a universal suspension for an automobile chassis simulation road test, including a backboard, a simulated shock absorption tower, a simulated dashpot, a simulated steering link, and a simulated lower control arm. Elongated holes and bolt holes are formed in a surface of the backboard; the simulated shock absorption tower is fixed on the bolt holes in an upper part of the backboard; one end of the simulated dashpot is movably connected to the simulated shock absorption tower, and the other end of the simulated dashpot is assembled with a shock absorber mounting hole of a steering knuckle; one end of the simulated steering link is movably connected to the backboard, and the other end of the simulated steering link is assembled with a steering link mounting hole of the steering knuckle; one end of an inner rod of the simulated lower control arm is movably connected to the backboard; one end of an outer rod of the simulated lower control arm is movably connected to the backboard; and the other ends of the inner rod and the outer rod of the simulated lower control arm are both assembled with a lower control arm mounting hole of the steering knuckle.

In some embodiments, a material of the backboard and the simulated shock absorption tower is Q345 carbon steel; and a material of the simulated dashpot, the simulated steering link, and the simulated lower control arm is #45 steel.

In some embodiments, the backboard includes 8-12 elongated holes which are symmetrically distributed along the left and right sides of the backboard; and the upper part of the backboard is uniformly provided with 30-50 bolt holes.

In some embodiments, the simulated shock absorption tower includes a supporting seat, an upper supporting point adjustment disk, a U-shaped seat, and a first T-shaped nut; a bottom surface of the supporting seat is provided with the elongated holes; a first circular slot is formed in the supporting seat; the bolt holes are formed in the first circular slot; the upper supporting point adjustment disk is provided with a first ring slot and a first T-shaped slot; bolts, the first ring slot, and the bolt holes in the first circular slot cooperate with each other to fix the upper supporting point adjustment disk on the supporting seat; the U-shaped seat is fixed in the first T-shaped slot through the first T-shaped nut; and one end of the simulated dashpot is movably connected to the U-shaped seat through a pin shaft.

In some embodiments, the simulated steering link includes an adapter pin shaft, a first rod end knuckle bearing, a length adjustment rod, a first horizontal bearing, a second T-shaped nut, and a steering link adjustment disk; a lower part of the backboard is provided with a second circular slot; the bolt holes are formed in the second circular slot; the steering link adjustment disk is provided with a second ring slot and a second T-shaped slot; bolts, the second ring slot, and the bolt holes of the second circular slot cooperate with each other to fix the steering link adjustment disk on the backboard; the second T-shaped nut and the second T-shaped slot cooperate with each other to fix one end of the first horizontal bearing; the first rod end knuckle bearing is connected to the first horizontal bearing through the length adjustment rod; and one end of the adapter pin shaft is connected to the first rod end knuckle bearing, and the other end of the adapter pin shaft is assembled with the steering link mounting hole of the steering knuckle.

In some embodiments, the simulated lower control arm includes a lower control arm inner-point U-shaped seat, a second rod end knuckle bearing, an inner rod, an adapter ball pin, a radial ball bearing, an outer rod, a second horizontal bearing, a third T-shaped nut, and a lower control arm outer-point adjustment disk; the lower part of the backboard is provided with a third circular slot; the third circular slot is provided with the bolt holes; one end of the inner rod is movably connected to the lower control arm inner-point U-shaped seat through the second rod end knuckle bearing; the lower control arm inner-point U-shaped seat is fixed on the backboard; one end of the outer rod is connected to a third T-shaped slot reserved in the lower control arm outer-point adjustment disk through the second horizontal bearing and the third T-shaped nut; the lower control arm outer-point adjustment disk is provided with a third ring slot and the third T-shaped slot; bolts, the third ring slot, and the bolt holes of the third circular slot cooperate with each other to fix the lower control arm outer-point adjustment disk on the backboard; the third T-shaped slot and the third T-shaped nut cooperate with each other to fix one end of the second horizontal bearing; the other end of the inner rod and the other end of the outer rod are assembled together through the radial ball bearing; the adapter ball pin is assembled in an inner hole of the radial ball bearing; and the adapter ball pin is assembled with the lower control arm mounting hole of the steering knuckle.

In some embodiments, the inner rod includes a lower control arm inner rod sleeve and a lower control arm inner rod mandrel; the lower control arm inner rod mandrel can slide in the lower control arm inner rod sleeve, and can be locked through bolts; the lower control arm inner rod sleeve is movably connected to the lower control arm inner-point U-shaped seat through the second rod end knuckle bearing; the outer rod includes a lower control arm outer rod mandrel and a lower control arm outer rod sleeve; the lower control arm outer rod mandrel can slide in the lower control arm outer rod sleeve, and can be locked through bolts; the lower control arm outer rod sleeve is connected to the lower control arm outer-point adjustment disk through the second horizontal bearing and the third T-shaped nut; and the lower control arm inner rod mandrel and the lower control arm outer rod mandrel are assembled together through the radial ball bearing.

In a second aspect, an embodiment of the present application provides test equipment for an automobile chassis simulation road test, including the universal suspension for the automobile chassis simulation road test in any one of the foregoing embodiments.

Compared with the prior art, the present disclosure has the following beneficial effects.

The present disclosure provides the universal suspension and the test equipment for the automobile chassis simulation road test. The universal suspension includes the backboard, the simulated shock absorption tower, the simulated dashpot, the simulated steering link, and the simulated lower control arm; the simulated dashpot is movably connected to the simulated shock absorption tower; the simulated steering link and the simulated lower control arm are both movably connected to the backboard; and the simulated dashpot, the simulated steering link, and the simulated lower control arm are all assembled with the corresponding mounting holes in the steering knuckle. Simulated parts with adjustable lengths and positions are used to replace the original vehicle's dashpot, steering link and lower control arm of the suspension, so that by means of adjusting the lengths and angles of all the parts of the test suspension, the universal suspension can be applicable to the spatial hard point requirements of most current Macpherson suspensions, thereby shortening the test cycle and reducing the development cost. Through the verification, the universal suspension structure fixture of the present disclosure can effectively replace the original vehicle's test fixture. Under the same fatigue test load and the same number of times of loading, the steering knuckle damage consistency is greater than 95%.

1-backboard; 2-simulated shock absorption tower; 3-simulated dashpot; 4-simulated steering link; 5-simulated lower control arm; 6-inner rod; 7-outer rod; 201-supporting seat; 202-upper supporting point adjustment disk; 203-U-shaped seat; 204-first T-shaped nut; 205-first circular slot; 206-first T-shaped slot; 207-first ring slot; 401-adapter pin shaft; 402-first rod end knuckle bearing; 403-length adjustment rod; 404-first horizontal bearing; 405-second T-shaped nut; 406-steering link adjustment disk; 407-second ring slot; 408-second circular slot;

501-lower control arm inner-point U-shaped seat; 502-second rod end knuckle bearing; 503-lower control arm inner rod sleeve; 504-lower control arm inner rod mandrel; 505-adapter ball pin; 506-radial ball bearing; 507-lower control arm outer rod mandrel; 508-lower control arm outer rod sleeve; 509-second horizontal bearing; 510-third T-shaped nut; 511-lower control arm outer-point adjustment disk; 512-third ring slot; 513-third circular slot.

DETAILED DESCRIPTION OF THE EMBODIMENTS

Embodiment 1

Figure 1:
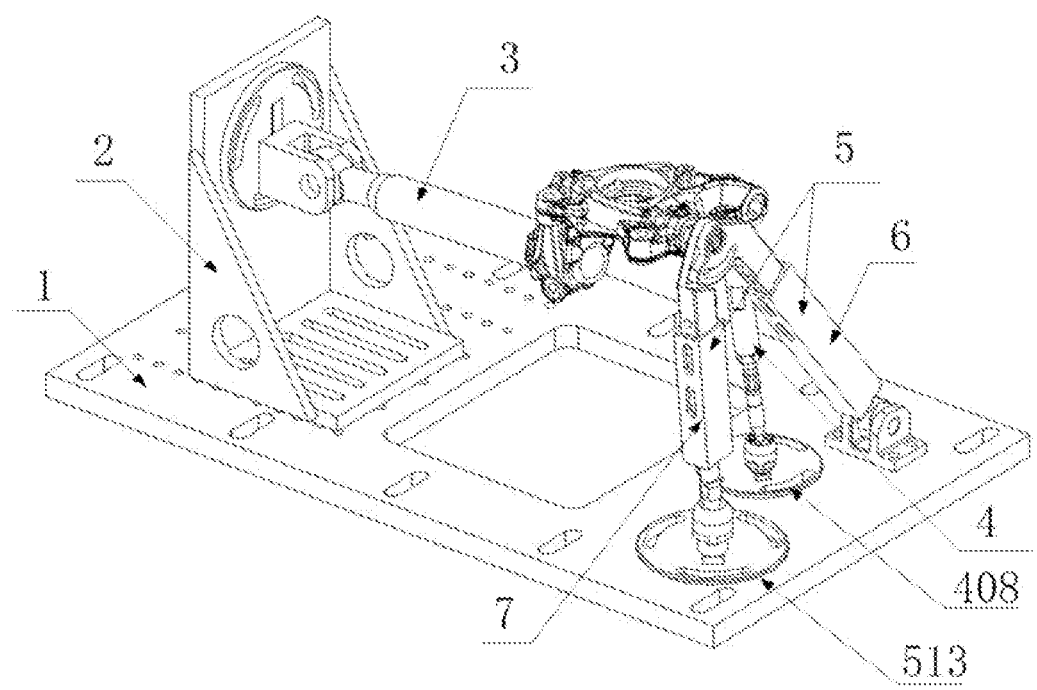
FIG. 1 is a three-dimensional schematic structural diagram of a universal suspension for an automobile chassis simulation road test of the present application.
Figure 2:
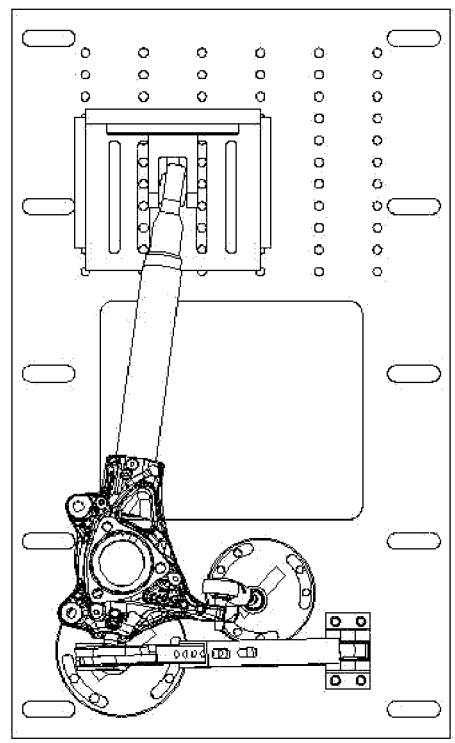
FIG. 2 is a front view of a universal suspension for an automobile chassis simulation road test of the present application.
Figure 3:
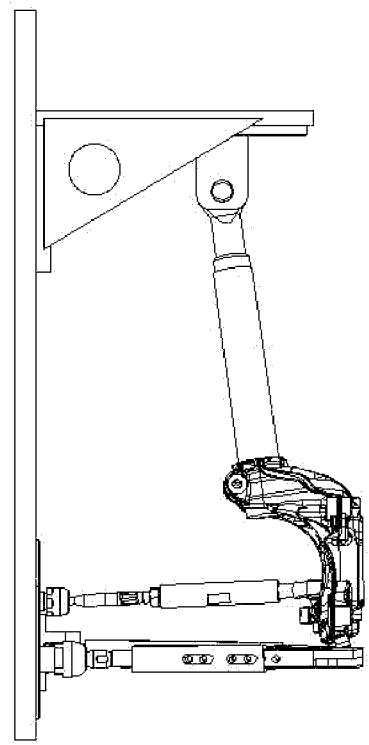
FIG. 3 is a left view of a universal suspension for an automobile chassis simulation road test of the present application.

Embodiment 1 provides a universal suspension for an automobile chassis simulation road test. As shown in FIGS. 1 to 3, the universal suspension includes a backboard 1, a simulated shock absorption tower 2, a simulated dashpot 3, a simulated steering link 4, and a simulated lower control arm 5. The backboard 1 is 800 mm-1200 mm in length, 500 mm-700 mm in width, and 20-30 mm in height; 8 to 12 groups of elongated holes which are 22 mm in width and 100 mm in length are symmetrically machined in left and right sides of a surface and are used to fixedly assemble and adjust the finished universal suspension. The backboard 1 can be fixed on a test machine for the chassis simulation road test through cooperation of bolts and the elongated holes. An upper part of the backboard 1 is uniformly provided with 30 to 50 groups of M12 bolt holes; a lower part of the backboard 1 is provided with a second circular slot 408 used to be connected to a steering link adjustment disk 406 of the simulated steering link 4, a third circular slot 513 used to be connected to a lower control arm outer-point adjustment disk 511 of the simulated lower control arm 5, and a set of four M12 bolt holes used to fix a U-shaped seat 501 of the simulated lower control arm 5.

As shown in FIGS. 1 to 3, the simulated shock absorption tower 2 is fixed on the backboard 1 through bolts. An upper end of the simulated dashpot 3 is movably connected to the simulated shock absorption tower 2, and a lower end of the simulated dashpot is assembled with a steering knuckle. One end of the simulated steering link 4 is movably connected to the backboard 1, and the other end of the simulated steering link is assembled with a steering link mounting hole of the steering knuckle. One end of the simulated lower control arm 5 is connected to the backboard 1, and the other end of the simulated lower control arm is assembled with a lower control arm mounting hole of the steering knuckle. One end of an inner rod 6 of the simulated lower control arm 5 is movably connected to the backboard 1; one end of an outer rod 7 of the simulated lower control arm 5 is movably connected to the backboard 1; and the other ends of the inner rod 6 and the outer rod 7 of the simulated lower control arm 5 are both assembled with a lower control arm mounting hole of the steering knuckle.

In present embodiment, a material of the backboard 1 and the simulated shock absorption tower 2 is Q345 carbon steel;

and a material of the simulated dashpot 3, the simulated steering link 4, and the simulated lower control arm 5 is #45 steel.

Figure 4:
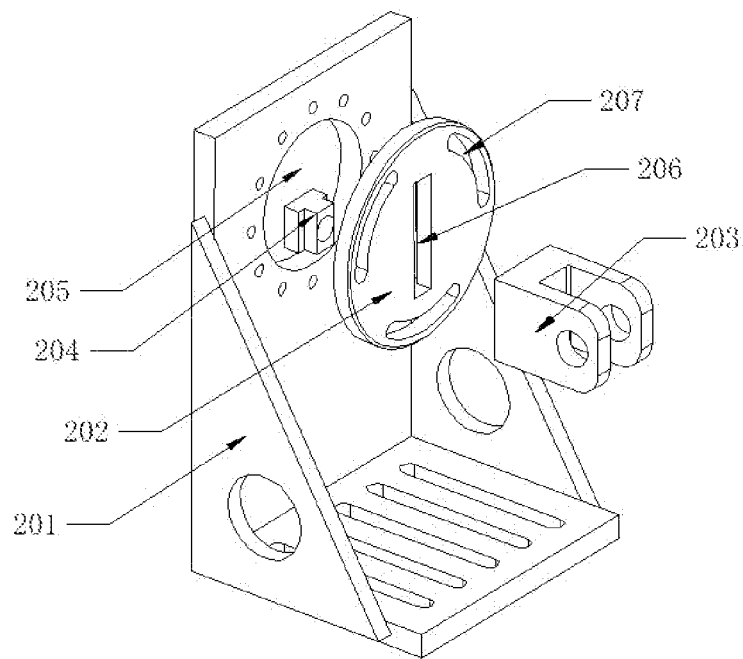
FIG. 4 is a schematic structural diagram of a simulated shock absorption tower of a universal suspension for an automobile chassis simulation road test of the present application.

As shown in FIG. 4, the simulated shock absorption tower 2 includes a supporting seat 201, an upper supporting point adjustment disk 202, a U-shaped seat 203, and a first T-shaped nut 204. A bottom surface of the supporting seat 201 is provided with the elongated holes which cooperate with the bolt holes in the backboard 1; and the supporting seat 201 is fixed in the bolt holes of the backboard 1 through bolts. Fixing in different elongated holes or different bolt holes on the backboard 1 through bolts means that the simulated shock absorption tower 2 can be roughly adjusted at positions on the backboard 1 in a full vehicle's X direction and a full vehicle's Y direction. A first circular slot 205 is formed in the supporting seat 201; the bolt holes are formed in the first circular slot 205 and are used to fix the upper supporting point adjustment disk 202; and the upper supporting point adjustment disk 202 is fixed on the first circular slot 205 reserved in the supporting seat 201. The upper supporting point adjustment disk 202 is provided with a first ring slot 207 and a first T-shaped slot 206; the first ring slot 207 cooperates with the bolt holes of the supporting seat 201 to fix the upper supporting point adjustment disk 202; and the first T-shaped slot 206 is used cooperatively with the first T-shaped nut 204 to fix the U-shaped seat 203. The U-shaped seat 203 is fixed in the first T-shaped slot 206 reserved in the upper supporting point adjustment disk 202 through the first T-shaped nut 204; and before the position is fixed, the first T-shaped nut 204 can slide in the first T-shaped slot 206 reserved in the upper supporting point adjustment disk 202 within a sliding range of 0-80 mm. The upper supporting point adjustment disk 202 freely rotates in the first circular slot 205, and is locked through bolts after being adjusted to a target angle; the first T-shaped nut 204 slides in the first T-shaped slot 206, and the U-shaped seat 203 is locked through bolts after the first T-shaped nut is adjusted a target position; and accurate positions of an upper supporting point in the full vehicle's X direction, the full vehicle's Y direction, and a full vehicle's Z direction are realized by adjusting an angle of the upper supporting point adjustment disk 202 and a position of the first T-shaped nut 204.

The above structural design of the simulated shock absorption tower 2 realizes gapless movement of the simulated shock absorption tower 2 in the full vehicle's X, Y, and Z directions to meet parameter requirements of different Macpherson suspensions. In the present embodiment, adjustment ranges of the upper supporting point of the dashpot are set as follows: 0-240 mm in the X direction, 0-80 mm in the Y direction, and 0-300 mm in the Z direction. The adjustment ranges of the upper supporting point of the dashpot are as shown in Table 1.

TABLE 1

Adjustment ranges of the upper supporting point of the dashpot

| Serial number | Adjustment direction | Adjustment range |
| --- | --- | --- |
| 1 | X direction | 0-240 mm |
| 2 | Y direction | 0-80 mm |
| 3 | Z direction | 0-300 mm |

Figure 5:
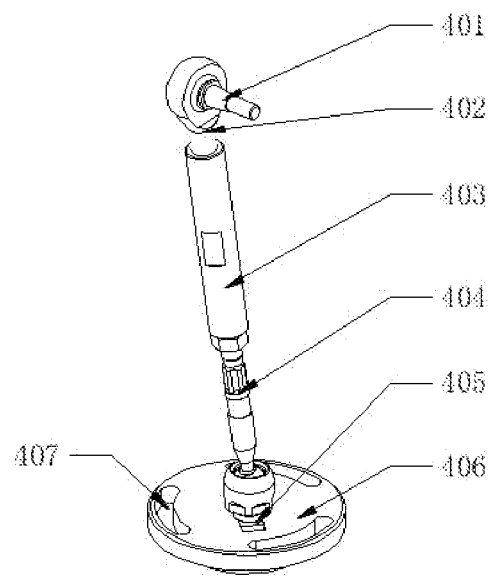
FIG. 5 is a schematic structural diagram of a simulated steering link of a universal suspension for an automobile chassis simulation road test of the present application.

A shown in FIG. 5, the simulated steering link 4 includes an adapter pin shaft 401, a first rod end knuckle bearing 402, a length adjustment rod 403, a first horizontal bearing 404, a second T-shaped nut 405, and the steering link adjustment disk 406. The steering link adjustment disk 406 is provided with a second ring slot 407 and a second T-shaped slot; the second ring slot 407 cooperates with the bolt holes of the second circular slot 408 in the backboard 1 to fix the steering link adjustment disk 406; and the second T-shaped slot is used cooperatively with the second T-shaped nut 405 to fix one end of the first horizontal bearing 404. The first horizontal bearing 404 is connected to the second T-shaped slot reserved in the steering link adjustment disk 406 through the second T-shaped nut 405; and before the position is fixed, the second T-shaped nut 405 can slide in the second T-shaped slot reserved in the steering link adjustment disk 406 within a sliding range of 0-80 mm. The steering link adjustment disk 406 is fixed in the second circular slot 408 reserved in the backboard 1; and before the position is fixed, the steering link adjustment disk 406 can freely rotate in the second circular slot 408 reserved in the backboard 1 to adjust the position. The first rod end knuckle bearing 402 is connected to the first horizontal bearing 404 through the length adjustment rod 403; and one end of the adapter pin shaft 401 is connected to the first rod end knuckle bearing 402, and the other end of the adapter pin shaft is connected to the steering knuckle.

In the present embodiment, the steering link adjustment disk 406 freely rotates in the second circular slot 408, and is locked through bolts after being adjusted to a target angle; the second T-shaped nut 405 slides in the second T-shaped slot, and the first horizontal bearing 404 is locked through bolts after the second T-shaped nut is adjusted to a target position; accurate positions of a steering link connecting point in the full vehicle's X direction and Z direction are realized by adjusting an angle of the steering link adjustment disk 406 and a position of the second T-shaped nut 405; and an accurate position of the steering link connecting point in the full vehicle's Y direction is realized by adjusting the length of the length adjustment rod. In the present embodiment, the length adjustment rod is replaced to meet the parameter requirements of different Macpherson suspensions; and adjustment ranges of the steering link connecting point are as follows: 0-80 mm in the X direction, 300-500 mm in the Y direction, and 0-80 mm in the Z direction. The adjustment ranges of the steering link connecting point are as shown in Table 2.

TABLE 2

Adjustment ranges of the steering link connecting point

| Serial number | Adjustment direction | Adjustment range |
| --- | --- | --- |
| 1 | X direction | 0-80 mm |
| 2 | Y direction | 300-500 mm |
| 3 | Z direction | 0-80 mm |

Figure 6:
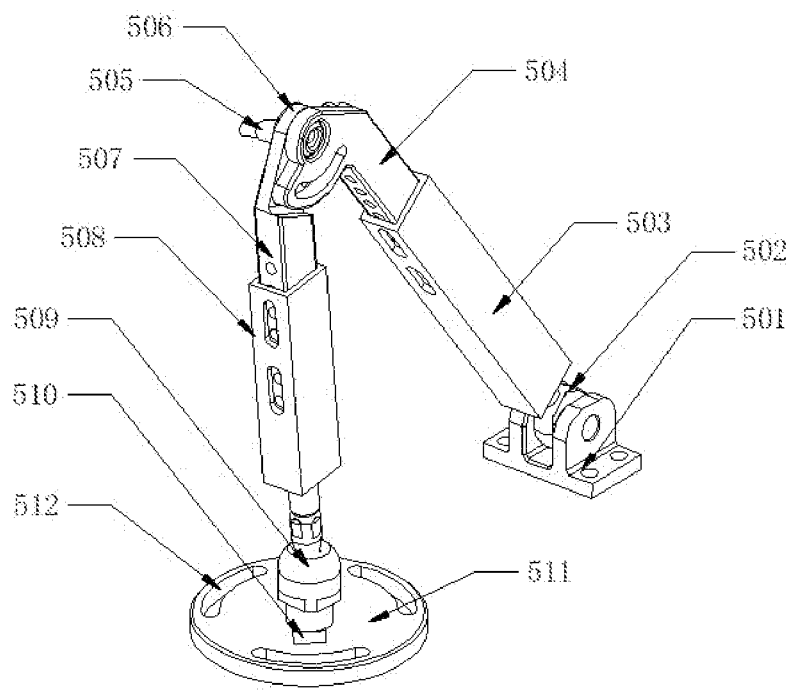
FIG. 6 is a schematic structural diagram of a simulated lower control arm of a universal suspension for an automobile chassis simulation road test of the present application.

As shown in FIG. 6, the simulated lower control arm 5 includes a lower control arm inner-point U-shaped seat 501, a second rod end knuckle bearing 502, an inner rod 6, an adapter ball pin 505, a radial ball bearing 506, an outer rod 7, a second horizontal bearing 509, a third T-shaped nut 510, and a lower control arm outer-point adjustment disk 511. The inner rod 6 includes a lower control arm inner rod sleeve 503 and a lower control arm inner rod mandrel 504; the lower control arm inner rod mandrel 504 can slide in the lower control arm inner rod sleeve 503, and can be locked through bolts. The outer rod 7 includes a lower control arm outer rod mandrel 507 and a lower control arm outer rod sleeve 508; the lower control arm outer rod mandrel 507 can slide in the lower control arm outer rod sleeve 508, and can be locked through bolts. The lower control arm outer-point adjustment disk 511 is provided with a third ring slot 512 and a third T-shaped slot; the third ring slot 512 cooperates with the bolt holes of the third circular slot 513 of the backboard to fix the lower control arm outer-point adjustment disk 511; and the third T-shaped slot is used cooperatively with the third T-shaped nut 510 to fix the second horizontal bearing. As shown in FIG. 6, the lower control arm inner rod sleeve 503 is movably connected to the lower control arm inner-point U-shaped seat 501 through the second rod end knuckle bearing 502; and the lower control arm inner-point U-shaped seat 501 is fixed on the backboard 1. The lower control arm inner rod mandrel 504 can slide in the lower control arm inner rod sleeve 503 at a sliding distance: 0-200 mm, and can be locked through bolts. The lower control arm outer rod sleeve 508 is connected to the third T-shaped slot reserved in the lower control arm outer-point adjustment disk 511 through the second horizontal bearing 509 and the third T-shaped nut 510; before the position is fixed, the third T-shaped nut 510 can freely slide in the third T-shaped slot reserved in the lower control arm outer-point adjustment disk 511; and the T-shaped slot is 80 mm in length. The lower control arm outer rod mandrel 507 can slide in the lower control arm outer rod sleeve 508 at a sliding distance: 0-200 mm, and is locked through bolts. The lower control arm inner rod mandrel 504 and the lower control arm outer rod mandrel 507 are assembled together through the radial ball bearing 506; the adapter ball pin 505 is assembled to an inner hole of the radial ball bearing; and the adapter ball pin 505 is assembled with the lower control arm mounting hole of the steering knuckle. In the present embodiment, a position of an outer point of the lower control arm, and lengths of the lower control arm outer rod 7 and the lower control arm inner rod 6 are adjusted to meet the parameter requirements of different Macpherson suspensions. Adjustment ranges of the steering link connecting point are as follows: a lower control arm outer point within 0-80 mm in the X direction, the lower control arm outer point within 0-80 mm in the Z direction, the lower control arm inner rod within 400-500 mm, and the lower control arm outer rod within 350-450 mm. The adjustment ranges of the lower control arm are as shown in Table 3.

TABLE 3

Adjustment ranges of the lower control arm

| Serial number | Adjustment direction | | Adjustment range |
|---|---|---|---|
| 1 | Lower control arm outer point | X direction | 0-80 mm |
| 2 | | Z direction | 0-80 mm |
| 3 | Lower control arm inner rod | | 400-500 mm |
| 4 | Lower control arm outer rod | | 350-450 mm |

Test 1: a certain vehicle model uses the universal suspension in Embodiment 1 for strain collection and test The universal suspension in Embodiment 1 is adjusted according to coordinates of key connecting points of the certain vehicle model; original vehicle's mating parts such as a steering knuckle, bearings, brake calipers, a brake disc, and a wheel tire assembly which are pasted with strain gauges; the bolts are screwed up according to standard torque; and the coordinates of the key points are as shown in Table 4.

TABLE 4

Coordinates of key points of a Macpherson suspension of a certain vehicle model

| Serial number | Names of key points | Coordinates of key points | | |
|---|---|---|---|---|
| | | X | Y | Z |
| 1 | Steering link inner point | 170 | −320 | 70 |
| 2 | Dashpot upper point | 70 | −600 | 650 |
| 3 | Lower control arm outer point | −20 | −380 | 20 |
| 4 | Lower control arm inner point | 290 | −380 | 25 |

The assembled universal suspension is mounted on a road simulation test machine; a road pavement is simulated by a rotary drum; a road load spectrum is loaded, which is 245 s in length and circulated for 5 times; strain data on the steering knuckle are collected; pseudo damage of each piece of strain data is calculated; and pseudo damage values are as shown in Table 5.

TABLE 5

Strain collected data of universal suspension

| Serial number | Positions of the strain gauge | Pseudo damage values |
|---|---|---|
| 1 | Position 1 | 0.54 |
| 2 | Position 2 | 0.95 |
| 3 | Position 3 | 0.28 |

Comparative example 1: original vehicle's Macpherson suspension strain collection The original vehicle's parts, such as springs, a lower control arm, a steering link, a steering knuckle, bearings, brake calipers, a brake disc, and a wheel tire assembly of a certain vehicle model, are assembled together, and bolts are screwed up according to standard torque. The assembled real vehicle's Macpherson suspension system is mounted on a road simulation test machine; a road pavement is simulated by a rotary drum; a road load spectrum is loaded, which is 245 s in length and circulated for 5 times; strain data on the steering knuckle are collected; pseudo damage of each piece of strain data is calculated; and pseudo damage values are as shown in Table 6.

TABLE 6

Strain collected data of real vehicle and suspension matching with the real vehicle

| Serial number | Positions of the strain gauge | Pseudo damage values |
|---|---|---|
| 1 | Position 1 | 0.52 |
| 2 | Position 2 | 0.89 |
| 3 | Position 3 | 0.27 |

Damage results of Test 1 and Comparative example 1 are analyzed:

The universal suspension for the automobile chassis simulation road test in Embodiment 1 undergoes Test 1, and is assembled according to real vehicle's spatial coordinates of Comparative example 1; the same road load spectrum is selected, and the same number of circulations is loaded; and the test and the comparative example are implemented on the same road simulation test machine. Therefore, results are comparable. Test data measured in Test 1 and Comparative example 1 are compared with data in Table 7. A result table is as follows.

TABLE 7

Strain data comparison table

| Serial number | Positions of the strain gauge | Pseudo damage value of the universal suspension of Embodiment 1 | Pseudo damage value of the original vehicle's Macpherson suspension |
| --- | --- | --- | --- |
| 1 | Position 1 | 0.54 | 0.52 |
| 2 | Position 2 | 0.95 | 0.89 |
| 3 | Position 3 | 0.28 | 0.27 |

It can be seen from the test results that under the same road load spectrum and the same number of times of loading, the pseudo damage values of the universal suspension disclosed in Embodiment 1 and the pseudo damage values of the original vehicle's Macpherson suspension are high in consistency so that the universal suspension can replace the original vehicle's Macpherson suspension for testing.

Embodiment 2

Embodiment 2 provides test equipment for an automobile chassis simulation road test, including the universal suspension for the automobile chassis simulation road test in Embodiment 1. The test equipment in the present embodiment 2 uses the universal suspension for the automobile chassis simulation road test in Embodiment 1; simulation parts with adjustable lengths and positions are used to replace an original vehicle's dashpot, steering link and lower control arm of the Macpherson suspension, so that by means of adjusting lengths and angles of all the parts of the test universal suspension, the universal suspension can be applicable to spatial hard point requirements of most current Macpherson suspensions, thereby shortening the test cycle and reducing the development cost. Through the verification, the universal suspension structure fixture of the present application can effectively replace the original vehicle's test fixture. Under the same fatigue test load and the same number of times of loading, the steering knuckle damage consistency is greater than 95%.

What is claimed is:

1. A universal suspension for an automobile chassis simulation road test, comprising a backboard, a simulated shock absorption tower, a simulated dashpot, a simulated steering link, and a simulated lower control arm, wherein
elongated holes and bolt holes are formed in a surface of the backboard;
the simulated shock absorption tower is fixed on the bolt holes in an upper part of the backboard;
one end of the simulated dashpot is movably connected to the simulated shock absorption tower, and the other end of the simulated dashpot is assembled with a shock absorber mounting hole of a steering knuckle;
one end of the simulated steering link is movably connected to the backboard, and the other end of the simulated steering link is assembled with a steering link mounting hole of the steering knuckle; and
one end of an inner rod of the simulated lower control arm is movably connected to the backboard; one end of an outer rod of the simulated lower control arm is movably connected to the backboard; and the other ends of the inner rod and the outer rod of the simulated lower control arm are both assembled with a lower control arm mounting hole of the steering knuckle,
wherein the simulated shock absorption tower comprises a supporting seat, an upper supporting point adjustment disk, a U-shaped seat, and a first T-shaped nut;
a bottom surface of the supporting seat is provided with elongated holes; a first circular slot is formed in the supporting seat; bolt holes are formed in the first circular slot;
the upper supporting point adjustment disk is provided with a first ring slot and a first T-shaped slot; bolts, the first ring slot, and the bolt holes in the first circular slot cooperate with each other to fix the upper supporting point adjustment disk on the supporting seat;
the U-shaped seat is fixed in the first T-shaped slot through the first T-shaped nut; and
one end of the simulated dashpot is movably connected to the U-shaped seat through a pin shaft.

2. The universal suspension for the automobile chassis simulation road test according to claim 1, wherein a material of the backboard and the simulated shock absorption tower is Q345 carbon steel; and a material of the simulated dashpot, the simulated steering link, and the simulated lower control arm is #45 steel.

3. The universal suspension for the automobile chassis simulation road test according to claim 1, wherein the backboard comprises 8-12 elongated holes which are symmetrically distributed along left and right sides of the backboard; and the upper part of the backboard is uniformly provided with 30-50 bolt holes.

4. Test equipment for an automobile chassis simulation road test, comprising the universal suspension for the automobile chassis simulation road test according to claim 1.

5. A universal suspension for the automobile chassis simulation road test, comprising a backboard, a simulated shock absorption tower, a simulated dashpot, a simulated steering link, and a simulated lower control arm, wherein
elongated holes and bolt holes are formed in a surface of the backboard;
the simulated shock absorption tower is fixed on the bolt holes in an upper part of the backboard;
one end of the simulated dashpot is movably connected to the simulated shock absorption tower, and the other end of the simulated dashpot is assembled with a shock absorber mounting hole of a steering knuckle;
one end of the simulated steering link is movably connected to the backboard, and the other end of the simulated steering link is assembled with a steering link mounting hole of the steering knuckle; and
one end of an inner rod of the simulated lower control arm is movably connected to the backboard; one end of an outer rod of the simulated lower control arm is movably connected to the backboard; and the other ends of the inner rod and the outer rod of the simulated lower control arm are both assembled with a lower control arm mounting hole of the steering knuckle,
wherein the simulated steering link comprises an adapter pin shaft, a first rod end knuckle bearing, a length adjustment rod, a first horizontal bearing, a second T-shaped nut, and a steering link adjustment disk;
a lower part of the backboard is provided with a second circular slot; bolt holes are formed in the second circular slot;

the steering link adjustment disk is provided with a second ring slot and a second T-shaped slot; bolts, the second ring slot, and the bolt holes of the second circular slot cooperate with each other to fix the steering link adjustment disk on the backboard; the second T-shaped nut and the second T-shaped slot cooperate with each other to fix one end of the first horizontal bearing;

the first rod end knuckle bearing is connected to the first horizontal bearing through the length adjustment rod; and one end of the adapter pin shaft is connected to the first rod end knuckle bearing, and the other end of the adapter pin shaft is assembled with the steering link mounting hole of the steering knuckle.

6. Test equipment for an automobile chassis simulation road test, comprising the universal suspension for the automobile chassis simulation road test according to claim 5.

7. A universal suspension for the automobile chassis simulation road test, comprising a backboard, a simulated shock absorption tower, a simulated dashpot, a simulated steering link, and a simulated lower control arm, wherein elongated holes and bolt holes are formed in a surface of the backboard;

the simulated shock absorption tower is fixed on the bolt holes in an upper part of the backboard;

one end of the simulated dashpot is movably connected to the simulated shock absorption tower, and the other end of the simulated dashpot is assembled with a shock absorber mounting hole of a steering knuckle;

one end of the simulated steering link is movably connected to the backboard, and the other end of the simulated steering link is assembled with a steering link mounting hole of the steering knuckle; and one end of an inner rod of the simulated lower control arm is movably connected to the backboard; one end of an outer rod of the simulated lower control arm is movably connected to the backboard; and the other ends of the inner rod and the outer rod of the simulated lower control arm are both assembled with a lower control arm mounting hole of the steering knuckle, wherein the simulated lower control arm comprises a lower control arm inner-point U-shaped seat, a second rod end knuckle bearing, an inner rod, an adapter ball pin, a radial ball bearing, an outer rod, a second horizontal bearing, a third T-shaped nut, and a lower control arm outer-point adjustment disk;

a lower part of the backboard is provided with a third circular slot; the third circular slot is provided with bolt holes;

one end of the inner rod is movably connected to the lower control arm inner-point U-shaped seat through the second rod end knuckle bearing; the lower control arm inner-point U-shaped seat is fixed on the backboard;

one end of the outer rod is connected to a third T-shaped slot reserved in the lower control arm outer-point adjustment disk through the second horizontal bearing and the third T-shaped nut;

the lower control arm outer-point adjustment disk is provided with a third ring slot and the third T-shaped slot; bolts, the third ring slot, and the bolt holes of the third circular slot cooperate with each other to fix the lower control arm outer-point adjustment disk on the backboard; the third T-shaped slot and the third T-shaped nut cooperate with each other to fix one end of the second horizontal bearing;

the other end of the inner rod and the other end of the outer rod are assembled together through the radial ball bearing; and the adapter ball pin is assembled in an inner hole of the radial ball bearing, and the adapter ball pin is assembled with the lower control arm mounting hole of the steering knuckle.

8. The universal suspension for the automobile chassis simulation road test according to claim 7, wherein the inner rod comprises a lower control arm inner rod sleeve and a lower control arm inner rod mandrel; the lower control arm inner rod mandrel may slide in the lower control arm inner rod sleeve, and may be locked through bolts; the lower control arm inner rod sleeve is movably connected to the lower control arm inner-point U-shaped seat through the second rod end knuckle bearing;

the outer rod comprises a lower control arm outer rod mandrel and a lower control arm outer rod sleeve; the lower control arm outer rod mandrel may slide in the lower control arm outer rod sleeve, and may be locked through bolts; the lower control arm outer rod sleeve is connected to the lower control arm outer-point adjustment disk through the second horizontal bearing and the third T-shaped nut; and the lower control arm inner rod mandrel and the lower control arm outer rod mandrel are assembled together through the radial ball bearing.

9. Test equipment for an automobile chassis simulation road test, comprising the universal suspension for the automobile chassis simulation road test according to claim 7.

\* \* \* \* \*